United States Patent
Obrist et al.

(10) Patent No.: US 10,556,493 B2
(45) Date of Patent: *Feb. 11, 2020

(54) BATTERY HOUSING

(71) Applicant: Obrist Technologies GmbH, Lustenau (AT)

(72) Inventors: Frank Obrist, Bregenz (AT); Martin Graz, Lustenau (AT); Joachim Georg Roth, Dornbirn (AT); Peter Giese, Herzogenaurach (DE)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 332 days.

This patent is subject to a terminal disclaimer.

(21) Appl. No.: 15/514,506

(22) PCT Filed: Sep. 22, 2015

(86) PCT No.: PCT/EP2015/071631
§ 371 (c)(1),
(2) Date: Mar. 25, 2017

(87) PCT Pub. No.: WO2016/046146
PCT Pub. Date: Mar. 31, 2016

(65) Prior Publication Data
US 2017/0274751 A1    Sep. 28, 2017

(30) Foreign Application Priority Data

Sep. 26, 2014 (DE) .................. 10 2014 114 021

(51) Int. Cl.
*B60K 1/04* (2019.01)
*B60L 11/18* (2006.01)
(Continued)

(52) U.S. Cl.
CPC .................. *B60K 1/04* (2013.01); *B60L 1/06* (2013.01); *B60L 50/64* (2019.02); *B60L 58/21* (2019.02);
(Continued)

(58) Field of Classification Search
CPC ...... H01M 2/1072; H01M 2/037; H01M 2/02; H01M 2/0257; H01M 10/63; H01M 10/625
See application file for complete search history.

(56) References Cited

U.S. PATENT DOCUMENTS 6,479,187 B1   11/2002   Takasaki et al.
6,662,891 B2   12/2003   Misu et al.
(Continued)

FOREIGN PATENT DOCUMENTS

CN   1622364 A   6/2005
CN   201233915 Y   5/2009
(Continued)

OTHER PUBLICATIONS

German Search Report for German Patent Application No. 10 2014 114 021.4, dated Jun. 23, 2015, 8 pages.
(Continued)

*Primary Examiner* — Miriam Stagg
*Assistant Examiner* — Rachel L Zhang
(74) *Attorney, Agent, or Firm* — Westman, Champlin & Koehler, P.A.

(57) ABSTRACT

The invention relates to a battery housing, in particular for an energy accumulator for a hybrid drive, comprising a tubular main body and at least two terminating covers, which are inserted into the main body and each have a cover plate that is offset inwards in the longitudinal direction of the main body and supports housing walls of the main body, wherein the terminating covers are each welded to the main
(Continued)

body and all joints of the battery housing are formed without separate connecting elements.

14 Claims, 2 Drawing Sheets

(51) Int. Cl.
    *H01M 2/10*         (2006.01)
    *H01M 10/625*     (2014.01)
    *H01M 10/643*     (2014.01)
    *H01M 10/613*     (2014.01)
    *B60L 1/06*        (2006.01)
    *B60L 50/64*      (2019.01)
    *B60L 58/26*      (2019.01)
    *B60L 58/21*      (2019.01)

(52) U.S. Cl.
    CPC ........... *B60L 58/26* (2019.02); *H01M 2/1077* (2013.01); *H01M 2/1094* (2013.01); *H01M 10/613* (2015.04); *H01M 10/625* (2015.04); *H01M 10/643* (2015.04); *H01M 2220/20* (2013.01); *Y02T 10/7005* (2013.01); *Y02T 10/7061* (2013.01)

(56) References Cited

U.S. PATENT DOCUMENTS

| | | | |
|---|---|---|---|
| 7,601,460 | B2 | 10/2009 | Hashimoto et al. |
| 9,660,235 | B2 | 5/2017 | Brenner et al. |
| 10,326,119 | B2 * | 6/2019 | Obrist .................... B60L 58/21 |
| 2001/0030069 | A1 | 10/2001 | Misu et al. |
| 2005/0118501 | A1 | 6/2005 | Hashimoto et al. |
| 2009/0064487 | A1 | 3/2009 | Hashimoto et al. |
| 2010/0129705 | A1 * | 5/2010 | Gutsch ................ H01M 2/0262 429/163 |
| 2011/0206948 | A1 | 8/2011 | Asai et al. |
| 2012/0129024 | A1 | 5/2012 | Marchio et al. |
| 2014/0242423 | A1 | 8/2014 | Jones |

FOREIGN PATENT DOCUMENTS

| | | |
|---|---|---|
| DE | 4041123 C1 | 1/1992 |
| DE | 600 24 166 T2 | 7/2006 |
| DE | 601 28 619 T2 | 1/2008 |
| EP | 1 153 803 A2 | 11/2001 |
| EP | 2362463 A2 | 8/2011 |
| JP | H05-275111 A | 10/1993 |
| JP | 2001-354039 A | 12/2001 |
| JP | 2003-157817 A | 5/2003 |
| JP | 2004-200024 A | 7/2004 |
| WO | 00/12076 A1 | 3/2000 |
| WO | 2012/014398 A1 | 2/2012 |
| WO | 2013120770 A1 | 8/2013 |

OTHER PUBLICATIONS

International Preliminary Report on Patentability for PCT/EP2015/071631, dated Apr. 6, 2017, 12 pages.

International Search Report (in English) and Written Opinion for International Application No. PCT/EP2015/071631, dated Dec. 14, 2015, 10 pages.

First Examination Report, including Search Report, for Chinese Patent Application No. 201580052270.X, dated May 17, 2019, 18 pages.

Office Action for Japanese Patent Application No. 2017-516749, dated Sep. 24, 2019, 8 pages.

* cited by examiner

BATTERY HOUSING

CROSS-REFERENCE TO RELATED APPLICATION

This Application is a Section 371 National Stage Application of International Application No. PCT/EP2015/071631, filed 22 Sep. 2015 and published as WO 2016/046146 A1 on 31 Mar. 2016, in German, the contents of which are hereby incorporated by reference in their entirety.

The invention relates to a battery housing, in particular for an energy accumulator for a hybrid drive. The invention additionally relates to a method for producing a housing for such an energy accumulator as storage battery for example for a hybrid drive for a motor vehicle.

Storage batteries for electric and hybrid drives of motor vehicles are generally assembled from batteries arranged within a housing. These batteries are preferably combined to form a number of layers and are temperature-controlled by cooling elements, which are arranged within the housing and are each in heat-conductive contact with the poles of the batteries. Fluid connectors for the supply and the discharge of a cooling fluid are provided on the housing so as to form a cooling circuit. In addition, the electrical connectors are also arranged on the housing for connection to the battery cells.

Such a housing structure is known from the prior art, for example by EP 1 109 543 A1. This document discloses a double-walled metal housing made of steel in the form of a cuboid that is closed outwardly in a gas-tight manner. The space between the two housing walls is evacuated and filled with insulating material. Storage cells and (for cooling) heat exchangers are arranged in the interior of the housing and can be removed from the housing as necessary. For this purpose, the cuboidal housing is closed at its end faces by a removable stopper, which likewise is double-walled and in which the cooling medium lines for the supply and discharge of the cooling medium to and from the heat exchangers are also arranged in an integrated manner.

The object of the present invention is to further develop a housing for such a battery such that said battery is reliable and, as appropriate, the safety in a crash situation (avoidance of risks of short circuits occurring and potential resultant fires) is further improved.

This object is achieved with the present invention in that the housing for the battery-shaped energy accumulator is constructed with a substantially tubular main body having at least two openings at the ends, into each of which openings a terminating cover with cover plate offset inwards in the longitudinal direction of the main body can be inserted in a form-fitting manner resting against the housing walls in a supporting manner, and wherein the terminating covers are welded in this position to the main body.

It is particularly advantageous if the main body and terminating cover are each produced from materials having identical material properties, in particular from a steel or a steel alloy.

The housing should have at most four, but preferably at most three, continuous fluid-tight weld seams.

It is particularly advantageous to construct the main body from two bent metal sheets, which are shaped substantially to give a C-profile, and to connect these metal sheets to one another at their longitudinal edges by welding, in such a way that a substantially rectangular-cuboidal tube profile is formed.

The cover plate for closing the end-side openings in the main body can extend substantially at right angles to the longitudinal axis of the main body and can have openings for insertion of the electrical connectors and/or fluid connectors. Here, the cover plate can in each case have a closed peripheral edge flange, which is formed in one part with the cover plate and extends outwardly in the longitudinal direction of the main body in its position inserted into the openings in the main body and is thus welded to the main body. The edge flange preferably has an outer edge which terminates flush with an end-side end edge of the main body.

The housing according to the invention can be secured to a vehicle preferably by welding at least one securing flange externally on to the main body. Due to this external securing flange arrangement, it is possible to provide individual arrangements on the vehicle largely independently of the vehicle geometry. Furthermore, by means of the welding of the main body, the terminating cover, and the welding-on of one or more securing flanges to the housing, there is no need for any further connection means between housing parts. The stability of the structure and the safety in a potential crash situation are thus significantly improved.

The material thickness of the main body and terminating cover can preferably be between 2 mm and 5 mm, in particular between 2.5 mm and 4 mm, in particular between 2.8 mm and 3.5 mm, in particular 3 mm. With such a design, the battery housing can be made dimensionally stable, at least in the longitudinal direction of the main body, under the action of an impact force of at least 20 times, in particular at least 30 times, in particular at least 40 times, in particular at least 50 times the force of gravity (g).

An energy accumulator in the form of a battery, in particular for a hybrid drive of a motor vehicle, comprising at least one housing according to the invention can be constructed with at least one cooling element and at least one cell block formed from battery cells which are formed from round cells, wherein the cooling element and the cell block are arranged within the housing, Here, the cooling element can be arranged between the cell block and the housing, wherein a pressure bag is provided between the cooling element and the housing, which pressure bag comprises a cured plastic and causes the housing to bulge outwardly at least in part, in such a way that the housing exerts an inwardly directed bracing force onto the cooling element and the cell block via the pressure bag.

The invention also relates to a motor vehicle, in particular a hybrid vehicle, comprising at least one housing for an energy accumulator and/or at least one battery.

With a design of this type of a housing for an energy accumulator, it is particularly advantageous that the electrical connectors and the connectors for the cooling fluid can be arranged fully separated and at a large distance from one another, in particular in that the electrical connectors in the cover plate of one terminating cover are arranged at one end face of the main body and the connectors for the cooling fluid (supply and discharge) are formed in the cover plate of the terminating cover on the opposite end side of the main body. This spaced-apart arrangement is also particularly advantageous for the corresponding safe guidance of the electrical connectors separately from the guidance of the cooling fluid in the interior of the battery housing.

A method for producing a housing for an energy accumulator or a battery system for a motor vehicle, in particular a hybrid vehicle, is characterised by the following steps:

bending a steel sheet to form a C-profile;
    assembling two C-profiles to form a substantially cuboidal main body having a square hollow profile;
    welding the longitudinal edges of the two C-profiles;

arranging two terminating covers in the end-side openings of the main body, wherein the terminating covers are arranged within the square hollow profile together with the cover plates offset inwards in the longitudinal direction of the main body;

welding the terminating covers to the main body.

The features and details of the subject matter of the invention will be explained in greater detail hereinafter on the basis of exemplary embodiments with reference to the accompanying, schematic drawings, in which.

Figure 1:
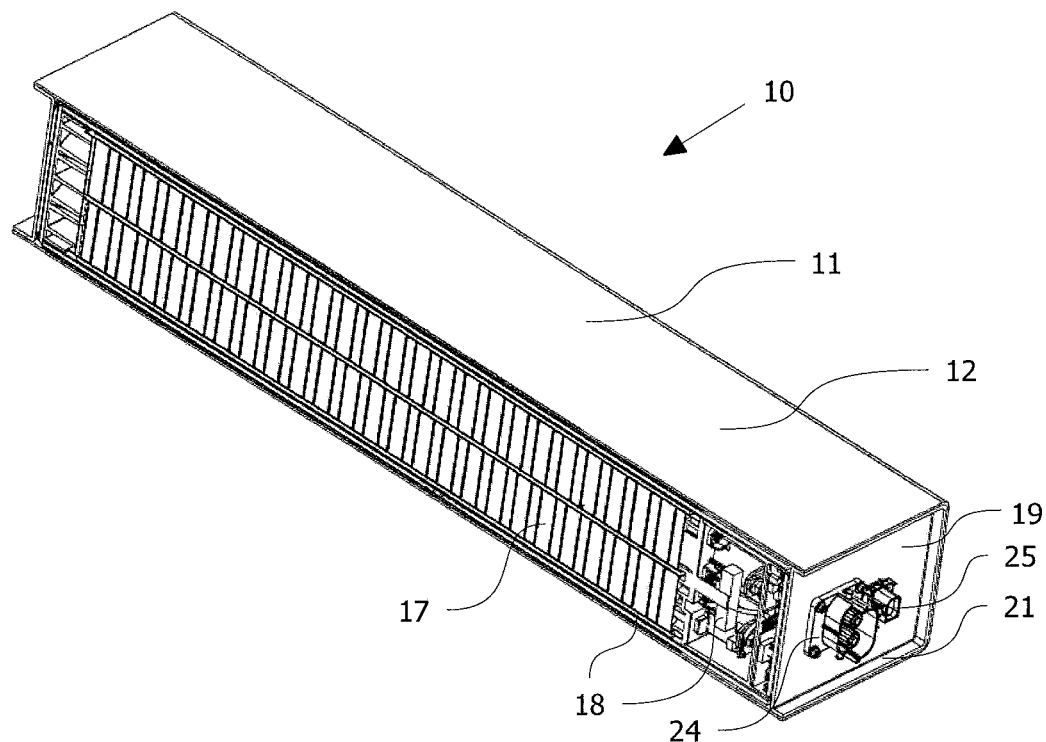
FIG. 1 shows a perspective view of a housing or a battery according to the invention. In this illustration, a side wall of the cuboidal housing has been omitted.

In the various figures of the drawings, a battery system 10 comprising a housing 11 is illustrated. This battery system 10 is suitable in particular for a vehicle, for example a motor vehicle having a hybrid drive. A vehicle, in particular motor vehicle, is understood here to mean vehicles which are moved on land, in the air, or also on water.

The housing 11 is constructed substantially from a tubular main body 12, which in the exemplary embodiment illustrated in the drawings has a substantially rectangular-cuboidal basic form. This cuboidal basic form can be achieved preferably in that two steel sheets bent to form a substantially C-shaped profile are joined together to form the cuboidal main body 12 and are welded in a fluid-tight manner at their longitudinal ends butted together.

A multiplicity of battery cells 17 and cooling elements 18 are arranged inside the housing 11.

A terminating cover 19 or 20 is inserted (form-fitting) resting in a supporting manner into each of the open end sides of the tubular main body 12. The terminating covers 19 and 20 are welded in this position to the walls of the tubular main body 12, wherein it is expedient if the end edges of the peripheral edge flange 21 each rest in a supported manner flush with the end-side end edges of the main body 12. A fluid-tight welding of the inserted terminating covers 19, 20 to the tubular main body 12 can thus be achieved in a particularly simple manner.

The electrical connectors for the battery cells 17 are arranged in the terminating cover 19. Besides a power socket 22, an electronics socket 23 for example (see FIG. 2) can also be provided. The power socket 22 serves to tap the electrical energy stored within the battery cells 17 or to charge the battery cells; the electronics socket 23 can produce the connection to electronic components within the housing 11 and for example can serve for signal and/or data exchange between the battery system 10 and the vehicle electronics, for example a bus system. Both the power socket 22 and the electronics socket 23 and the component 24 supporting these are fixed on the terminating cover 19, sealed in a fluid-tight manner.

An opening or a valve 25—preferably distanced from the electrical connectors 22 and 23—can additionally be arranged in the terminating cover 19. The valve opening in the terminating cover 19 carries a valve externally for improved maintenance, which valve for example can be equipped with an air-drying means. This air-drying means should rest directly on the valve opening, such that the effect is provided inside the housing 11 and therefore the interior of the housing 11 can be continuously rid of moisture.

The terminating cover 20 is inserted in the second end side of the tubular main body 12 or the housing 11 in a manner comparable to the insertion of the terminating cover 19 and is welded there in a fluid-tight manner. As is also the case with the terminating cover 19, the terminating cover 20 has a cover plate 19.1 or 20.1 that is offset inwards in the longitudinal direction of the main body 12—offset by the peripheral edge flange 21. In contrast to the terminating cover 19 or the cover plate 19.1, however, it is not the electronic or electrical connectors that are introduced into the terminating cover 20 or into the cover plate 20.1, but instead the connectors 26 for the supply and discharge of cooling fluid. This arrangement of the fluid connectors 26 fully separated from the electrical connectors 22 and 23 is of particular importance for safety reasons.

Figure 2:
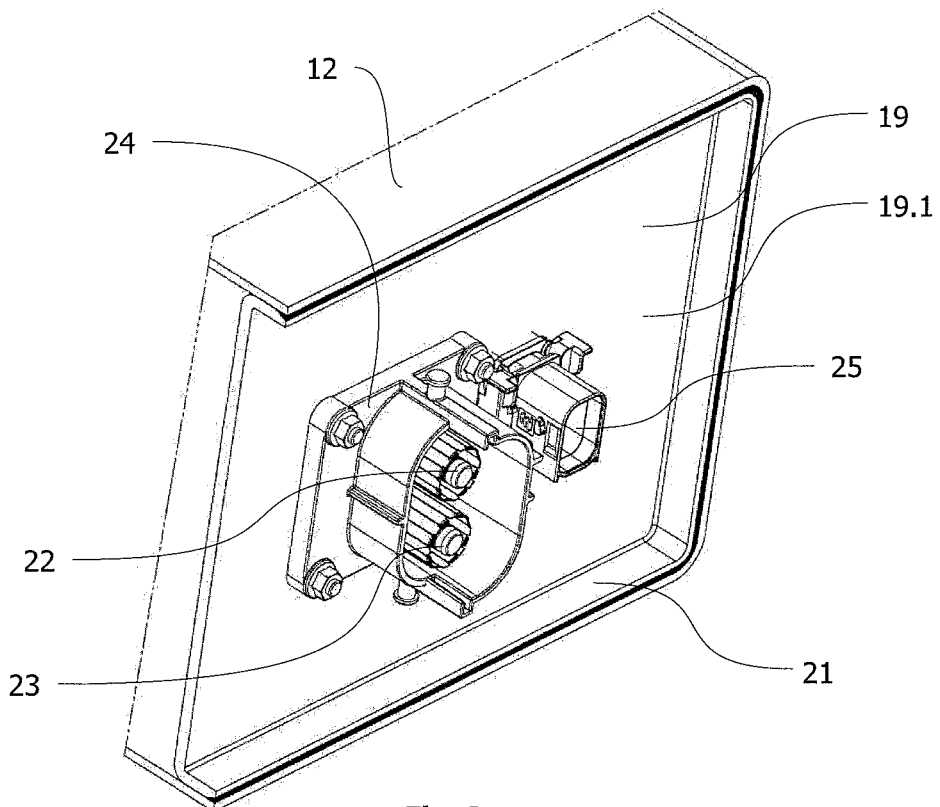
FIG. 2 a perspective arrangement of a terminating cover according to the invention.

The design shown in particular in FIG. 2 of terminating cover 19 with its integrated cover plate 19.1 and the peripheral edge flange 21—which is largely identical to the structural design of the terminating cover 20 with its cover plate 20.1—offers a range of advantages: On the one hand, not only is an increased stability of the housing 11 achieved by the supporting resting design of the terminating covers 19 and 20, but a particularly simple securing with easily attainable fluid tightness is achieved also at the connector points, firstly by the form fit and secondly by the edge-side welding. In addition, however, what is achieved in particular is that the fluid connectors 26 and the electrical connectors 22 and 23 as well as the valve 25 are arranged in a protected space offset inwards in the longitudinal direction of the tubular main body 12.

For crash safety and for durability it is particularly advantageous to produce all components of the housing 11—main body 12 with the C-profiles, terminating covers 19 and 20, and also the components for securing the electrical connectors, valves, fluid connectors—from a material having identical material properties, but in particular from a steel or a steel alloy. Here, a wall thickness of between 2 mm and 5 mm for the main body 12 and the terminating covers 19 and 20 has proven to be particularly advantageous; a wall thickness of approximately 3 mm is very particularly advantageous.

The stability of the design and in particular the crash safety of the battery system can be improved additionally in that cooling elements are arranged between the cell blocks formed from battery cells 17 in the interior of the housing 11 and the inner walls of the tubular main body 12 and at least one pressure bag is arranged between cooling element and inner walls of the main body 12, which pressure bag comprises a cured plastic and braces the tubular main body 12 or causes it to bulge outwardly at least in part, in such a way that the housing is able to exert an inwardly directed bracing force onto cooling element and cell block via the pressure bag.

Figure 3:
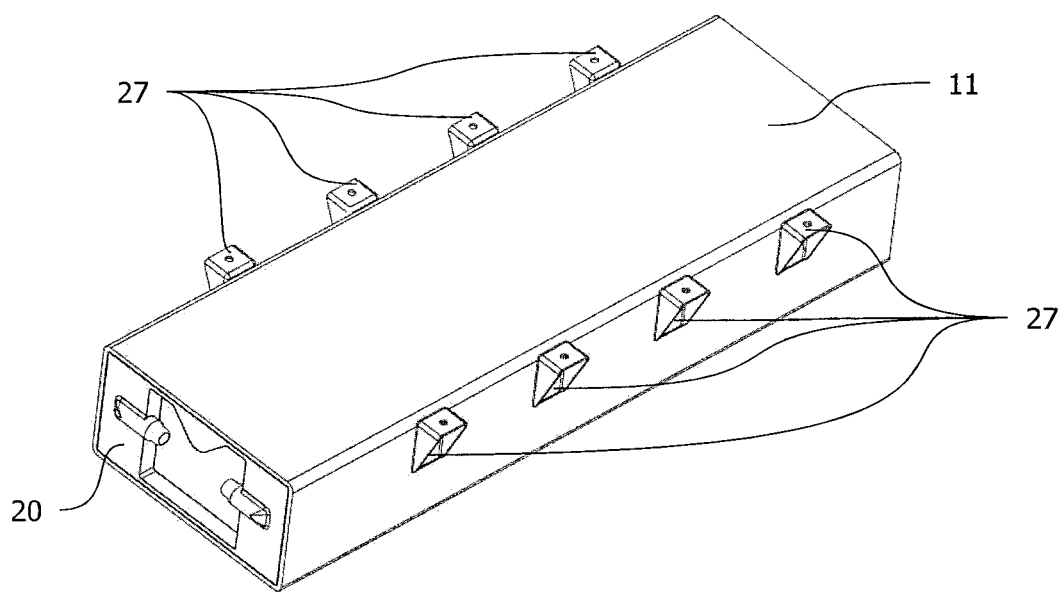
FIGS. 3, 4 and 5 show possibilities for the arrangement of securing flanges by welding to the main body of the housing.
Figure 4:
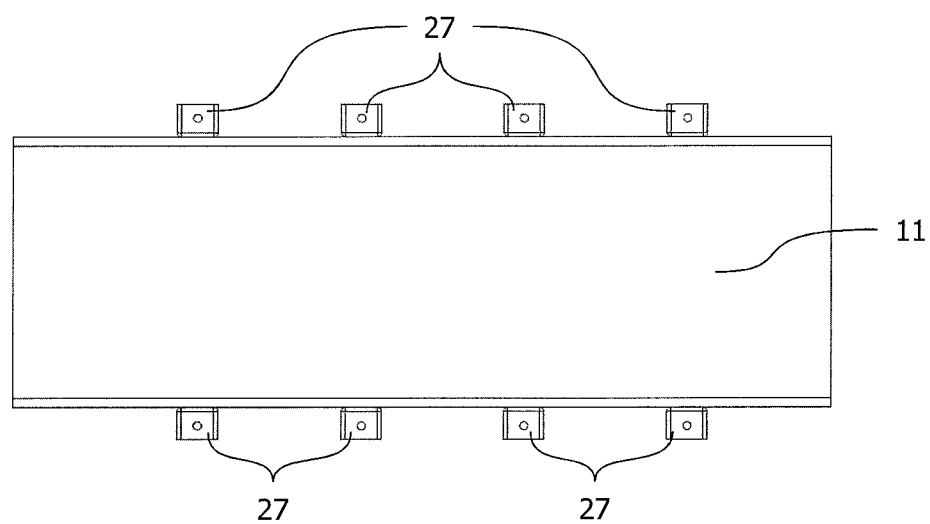
Figure 5:
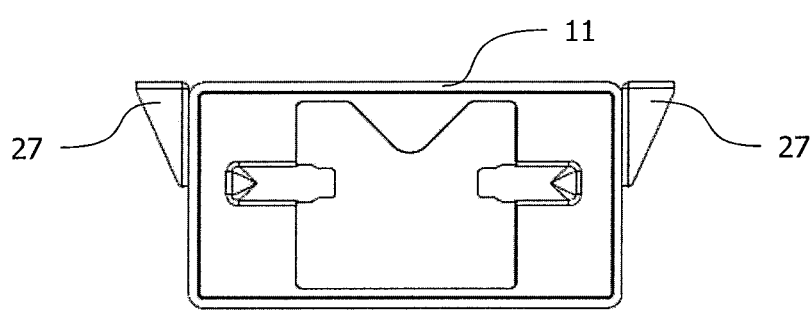

FIGS. 3-5 illustrate a possible form of securing a battery housing in a motor vehicle. For this purpose, it is proposed to weld on a plurality of securing flanges 27 externally at arbitrary points of the tubular main body 12, which securing flanges for example are intended for screwing the battery system 10 to the structure of a vehicle. Due to the securing flanges 27 to be attached at arbitrary points of the housing 11, an individual adaptation of the securing to the vehicle geometry is easily possible. The number and positioning of the securing flanges 27 can be selected practically arbitrarily. A particular advantage of this securing form via welded-on securing flanges 27 can also be considered the fact that the stability of the housing 11 in respect of crash safety and in particular in respect of the protection of the functional components in the interior of the housing 11 is in no way impaired by the external welding-on of the securing flanges 27. Of course, securing flanges are conceivable not only on the narrow sides of the housing 11, as in the example shown according to FIGS. 3-5, but rather are also possible on the upper side or the lower side—depending on the vehicle requirements.

LIST OF REFERENCE SIGNS

10 battery system
11 housing
12 tubular main body
17 battery cells
18 cooling elements
19 terminating cover
19.1 cover plate
20 terminating cover
20.1 cover plate
21 edge flange of 19 or 20
22 power socket
23 electronics socket
24 component
25 valve/valve opening
26 fluid connectors for cooling fluid
27 securing flange

The invention claimed is:

1. A battery comprising at least one battery housing, the battery housing comprising:
   a tubular main body and at least two terminating covers, which are inserted into the main body and each have a cover plate that is offset inwards in the longitudinal direction of the main body and supports housing walls of the main body, wherein the terminating covers are each welded to the main body and all joints of the battery housing are formed without separate connecting elements;
   at least one cooling element and at least one cell block formed from battery cells which are formed as round cells, wherein the cooling element and the cell block are arranged within the battery housing;
   wherein cooling element is arranged between the cell block and the battery housing, wherein a pressure bag is provided between the cooling element and the battery housing, which pressure hag comprises a cured plastic and causes the battery housing to bulge outwardly at least in part, in such a way that the battery housing exerts an inwardly directed bracing force onto the cooling element and the cell block via the pressure bag.

2. The battery according to claim 1, wherein
   the main body and the terminating cover are each formed from materials, in particular a steel or a steel alloy, which has identical material properties.

3. The battery according to claim 1, wherein
   at most four continuous, fluid-tight weld seams.

4. The battery according to claim 1, wherein
   the main body is formed from two metal sheets each bent to give a C-profile, which metal sheets are welded to one another at their longitudinal edges in such a way that a substantially rectangular tube profile is formed.

5. The battery according to claim 1, wherein
   the cover plate extends substantially at right angles to a longitudinal axis of the main body and has openings for guiding through electrical connectors and/or fluid connectors.

6. The battery according to claim 1, wherein
   the terminating covers each have a peripheral edge flange which is formed in one piece with the cover plate, extends outwardly in the longitudinal direction of the main body and is welded to the main body.

7. The battery according to claim 6, wherein
   the edge flange has an outer edge which terminates flush with an end-side end edge of the main body.

8. The battery according to claim 1, wherein
   at least one securing flange is welded on to the main body and is suitable for securing the main body to a vehicle.

9. The battery according to claim 1, wherein
   the main body and the terminating cover each have a wall thickness between 2 mm and 5 mm.

10. The battery according to claim 1, wherein
    the battery housing is dimensionally stable at least in the longitudinal direction of the main body under the action of an impact force of at least 20 times the force of gravity.

11. A motor vehicle comprising at least one battery housing and/or at least one battery according to claim 1.

12. A method for producing a battery housing according to claim 1, said method comprising the following steps:
    bending a steel sheet to form a C-profile;
    welding the longitudinal edges of two C-profiles to form a main body having a square hollow profile;
    arranging two terminating covers at the end sides of the main body, wherein the terminating covers are arranged within the square hollow profile;
    welding the terminating covers to the main body.

13. The motor vehicle according to claim 11, wherein the motor vehicle is a hybrid vehicle.

14. The battery according to claim 1, wherein the battery housing is for an energy accumulator for a hybrid drive.

* * * * *